United States Patent
Huang et al.

(10) Patent No.: US 10,511,601 B2
(45) Date of Patent: Dec. 17, 2019

(54) SECURITY CONTROL METHOD FOR SOCIAL NETWORK USER, SOCIAL APPLICATION DEVICE AND TERMINAL

(71) Applicant: ZTE Corporation, Shenzhen (CN)

(72) Inventors: Wei Huang, Shenzhen (CN); Haifei Wang, Shenzhen (CN); Weiwei Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 290 days.

(21) Appl. No.: 15/510,311

(22) PCT Filed: Nov. 13, 2014

(86) PCT No.: PCT/CN2014/090990
§ 371 (c)(1),
(2) Date: Mar. 10, 2017

(87) PCT Pub. No.: WO2015/154457
PCT Pub. Date: Oct. 15, 2015

(65) Prior Publication Data
US 2017/0264614 A1   Sep. 14, 2017

(30) Foreign Application Priority Data
Sep. 11, 2014 (CN) ............. 2014 1 0462589

(51) Int. Cl.
*H04L 29/06* (2006.01)
*H04L 29/08* (2006.01)
(Continued)

(52) U.S. Cl.
CPC .............. *H04L 63/10* (2013.01); *G06F 21/10* (2013.01); *G06F 21/6245* (2013.01);
(Continued)

(58) Field of Classification Search
CPC ... H04L 63/10; H04L 63/102; H04L 63/0428; H04L 67/06; H04W 12/08; G06F 21/6245; G06F 21/10
See application file for complete search history.

(56) References Cited

U.S. PATENT DOCUMENTS 5,892,900 A * 4/1999 Ginter .................... G06F 21/10
726/26
2007/0124601 A1* 5/2007 Singh .................... G06F 21/31
713/189
(Continued)

FOREIGN PATENT DOCUMENTS

| CN | 103379451 A | 10/2013 |
|---|---|---|
| CN | 103399751 A | 11/2013 |

(Continued)

OTHER PUBLICATIONS

International Search Report for corresponding application PCT/CN2014/090990 filed on Nov. 13, 2014; dated Apr. 21, 2015.

*Primary Examiner* — Abu S Sholeman
(74) *Attorney, Agent, or Firm* — Cantor Colburn LLP (57) ABSTRACT

A security control method for a social network user, a social application device and a terminal are provided. The method includes: when information is exchanged between users, a local-end social application acquires the security control authority of a local-end user set by an opposite-end user, and the local-end social application controls, according to the security control authority of the local-end user, the copying operation and the screen capturing operation of the local-end user on the information exchanged.

18 Claims, 2 Drawing Sheets

(51) Int. Cl.
*G06F 21/10* (2013.01)
*G06F 21/62* (2013.01)
*H04W 12/08* (2009.01)

(52) U.S. Cl.
CPC ........ *H04L 63/0428* (2013.01); *H04L 63/102* (2013.01); *H04L 67/06* (2013.01); *H04W 12/08* (2013.01)

(56) References Cited

U.S. PATENT DOCUMENTS

| | | | | |
|---|---|---|---|---|
| 2007/0234069 | A1* | 10/2007 | Ginter | G06F 21/10 |
| | | | | 713/189 |
| 2009/0156179 | A1* | 6/2009 | Hahn | G06Q 10/101 |
| | | | | 455/414.1 |
| 2014/0006395 | A1* | 1/2014 | Wolfe | G06F 16/5866 |
| | | | | 707/732 |
| 2014/0090055 | A1* | 3/2014 | Palumbo | H04L 63/145 |
| | | | | 726/22 |
| 2014/0283105 | A1* | 9/2014 | Trevor | G06F 21/10 |
| | | | | 726/27 |

FOREIGN PATENT DOCUMENTS

| | | |
|---|---|---|
| CN | 103746978 A | 4/2014 |
| CN | 103780626 A | 5/2014 |

\* cited by examiner

SECURITY CONTROL METHOD FOR SOCIAL NETWORK USER, SOCIAL APPLICATION DEVICE AND TERMINAL

TECHNICAL FIELD

The present disclosure relates to the field of security control technologies for social network users and in particular to a security control method for a social network user, a social application device and a terminal.

BACKGROUND

With the rapid development and popularization of mobile terminals, uplink and downlink data rates supportive to wireless networks increase by times, and mobile phones that were used merely for communication now advance rapidly and show many capabilities in new applications, especially in the aspect of data services. Mobile phone has become an indispensable information terminal, and more and more people use mobile phones as a replacement for computer, camera and electronic book. The appearance of wireless interconnection techniques makes mobile phones much smarter, and using wireless networks to acquire information has become the most important purpose of a terminal user. Wireless networks and mobile terminals are used for information inquiry, social contacts, shopping and navigation, thus greatly improving user experience.

Information is various and massive nowadays, more and more attentions are paid to privacy in social networks; as information spreads unchecked, users put forward higher and higher privacy protection demands because users cannot be much relaxed unless during a private chatting process, and information including pictures, words and voice needs to be kept private. Based on these demands, privacy protection becomes the general trend. The more rampant social contacts are, the greater the potential of privacy applications is. As an embodiment of a privacy application, Wechat only permits friends to view comments in the Moments, and merely by means of this function, Wechat is quite satisfactory to users. In interactions over social networks, more and more attentions are focused on the privacy of information, a picture shared with friends will be deleted automatically within 10 seconds or a shorter time after the picture is received by a friend, this is Snapchat.

However, the privacy function of existing social software, for example, Snapchat, has severe functional defects because the user of a mobile phone can store the pictures, words or videos displayed on the current screen by implementing a screen capturing operation using the screen capturing function of the mobile phone or a computer-side tool connected with the mobile phone without being perceived by the opposite-end user. This causes a risk to the privacy of the user of existing social software. How to avoid this risk is the technical problem the present disclosure is intended to address.

SUMMARY

To address the problem existing in the conventional art that the storage of pictures, words or videos displayed on the current screen through a screen capturing operation without being perceived by an opposite user causes a risk to the privacy of the user, the present disclosure provides a security control method for a social network user, a device and a terminal.

To address the foregoing technical problem, the present disclosure adopts the following technical solutions:

a security control method for a social network user includes the following step that:

when information is exchanged between users, a local-end social application acquires the security control authority of a local-end user set by an opposite-end user and controls, according to the security control authority, the operation of the local-end user on the information exchanged.

Preferably, before the local-end social application acquires the security control authority of the local-end user set by the opposite-end user, the method further includes the following steps:

the local-end social application receives the security control authority of the local-end user set by the opposite-end user and sent from an opposite-end application; and the local-end social application acquires the security control authority of the opposite-end user set by the local-end user and sends the security control authority to the opposite-end application.

Preferably, the method further includes the following steps:

when receiving the security control authority of the local-end user set by the opposite-end user and sent from the opposite-end application, the local-end social application encrypts the security control authority and stores the encrypted security control authority in a nonvolatile memory; and when acquiring the security control authority of the opposite-end user set by the local-end user, the local-end social application stores the security control authority of the opposite-end user set by the local-end user in the nonvolatile memory.

Preferably, the method further includes the following steps:

the local-end social application sends an indication message indicative of no acquisition of security control authority to the opposite-end social application if the security control authority of the local-end user set by the opposite-end is not received by the local-end social application; and the local-end social application receives a feedback message from the opposite-end social application and controls the operation of the local-end user according to the security control authority of the local-end user carried in the feedback message.

Preferably, the step that the local-end social application controls, according to the security control authority, the operation of the local-end user on the information exchanged includes:

permitting the local-end user to operate the exchanged information when the security control authority of the local-end user is high; and forbidding the local-end user to operate the exchanged information when the security control authority of the local-end user is low.

Preferably, the operation is a copying operation and/or a screen capturing operation.

Preferably, the step of forbidding the local-end user to operate the exchanged information includes the following steps that:

the local-end social application forbids the local-end user to perform a screen capturing operation with a screen capturing key;

the local-end social application forbids the local-end user to perform a screen capturing operation using a connected third-party device; and the local-end social application forbids the local-end user to perform a screen capturing operation using a piece of installed screen capturing software.

Preferably, the step that the local-end social application forbids the local-end user to perform a screen capturing operation with a screen capturing key includes the following step that: the local-end social application forbids, by occupying a shortcut key for screen capturing or a key combination for screen capturing, the use of the screen capturing key for screen capturing.

the step that the local-end social application forbids the local-end user to perform a screen capturing operation using a connected third-party device includes the following step that: the local-end social application forbids, by forbidding the communication with the third-party device, the use of the connected third-party device for screen capturing; and the step that the local-end social application forbids the local-end user to perform a screen capturing operation using a piece of installed screen capturing software includes the following step that: the local-end social application forbids, by requesting the system to close the screen capturing software run in the background, the use of the screen capturing software for screen capturing.

Preferably, the method further includes a step that the local-end social application automatically deletes the exchanged information after the information exchange between the users is completed in a case where the security control authority of the local-end user is low.

A social application device includes an authority acquisition module and a security control module, wherein the authority acquisition module is configured to acquire, when information is exchanged between users, the security control authority of a local-end user set by an opposite-end user; and the security control module is configured to control, according to the security control authority of the local-end user, the operation of the local-end user on the information exchanged.

Preferably, the device further includes an authority synchronization module, wherein:

the authority synchronization module is configured to receive and store the security control authority of the local-end user set by the opposite-end user and sent from an opposite end, acquire the security control authority of the opposite-end user set by the local-end user and send the security control authority to the opposite end.

Preferably, the authority acquisition module is also configured to:

send an indication message indicative of no acquisition of security control authority to the opposite end when the security control authority of the local-end user set by the opposite-end is not received; and receive a feedback message from the opposite end and trigger the security control module according to the security control authority of the local-end user carried in the feedback message.

Preferably, the security control module is configured to control, according to the security control authority of the local-end user, the operation of the local-end user on the exchanged information in the following way:

the security control module permits the local-end user to operate the exchanged information when the security control authority of the local-end user is high, or the security control module forbids the local-end user to operate the exchanged information when the security control authority of the local-end user is low.

Preferably, the operation is a copying operation and/or a screen capturing operation.

Preferably, the security control module further includes a first screen capturing processing sub-module, a second screen capturing processing sub-module and a third screen capturing processing sub-module, wherein the first screen capturing processing sub-module is configured to forbid the use of a screen capturing key for screen capturing by occupying a shortcut key for screen capturing or a key combination for screen capturing;

the second screen capturing processing sub-module is configured to forbid the use of a third-party device for screen capturing by forbidding the communication with the third-party device; and the third screen capturing processing sub-module is configured to forbid the use of a piece of screen capturing software for screen capturing by requesting a system to close the screen capturing software run in the background.

Preferably, the security control module is also configured to:

automatically delete the exchanged information after the information exchange between the users is completed if the security control authority of the local-end user is low.

A terminal is provided on which any one of the foregoing social application devices is installed.

A computer program comprises program instructions which, when executed by a terminal, cause the terminal to execute any one of the foregoing security control methods for a social network user.

A carrier is provided on which the computer program is recorded.

The technical solutions of the present disclosure have the following beneficial effects:

the present disclosure provides a simple and practical security control scheme for social network users which can be set freely by users and which can provide a better user experience, this scheme is currently lacked in many social application fields. By setting the authority of an opposite-end user to forbid an opposite-end user having a low authority to implement a copying operation or a screen capturing operation, the present disclosure prevents the various security problems caused by the loss of sensitive information without being perceived by a user.

Further, by encrypting a security control authority received by a local end from an opposite end and storing the encrypted security control authority in a nonvolatile memory, the present disclosure prevents an unauthorized user from modifying authority information arbitrarily and improves security further.

BRIEF DESCRIPTION OF THE DRAWINGS

To make the technical solutions of the present disclosure understood better, the accompanying drawings needed for the description of embodiments or relevant arts are introduced briefly, and apparently, the accompanying drawings described below merely illustrate certain embodiments of the present disclosure, and other drawings can be devised by those of ordinary skill in the art based on these accompanying drawings without making creative efforts.

DETAILED DESCRIPTION OF THE EMBODIMENTS

The technical solutions provided herein will be described below clearly and completely with reference to accompanying drawings involved in embodiments of the present disclosure, and apparently, the embodiments described herein merely constitute a part of but not all of the embodiments of the present disclosure. The other embodiments devised by those of ordinary skill in the art based on those mentioned herein without making creative efforts should all fall within the scope of protection of the present disclosure.

A security control method for a social network user, a social application device and a terminal are provided herein to improve the security of the exchange of information over a social network so that a user can set an information reading right and an information storage right freely to forbid an opposite-end user to store information through an illegal screen capturing operation to furthest avoid the leakage of private information. The specific implementation process of the present disclosure is described below with reference to several specific embodiments.

Embodiment 1

Figure 1:
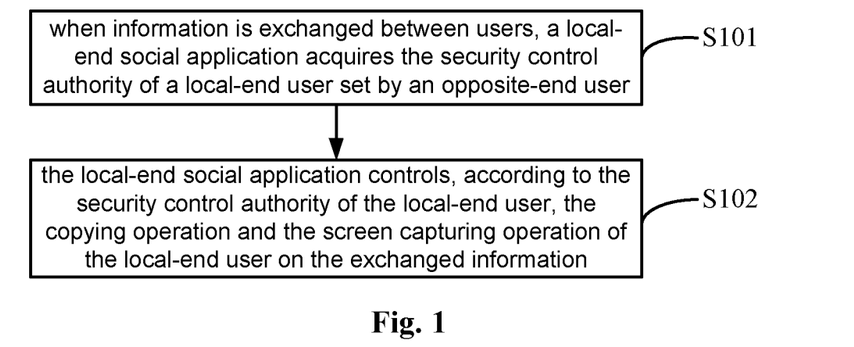
FIG. 1 is a flowchart illustrating a security control method for a social network user provided in an embodiment of the present disclosure.

As shown in FIG. 1, a security control method for a social network user provided in an embodiment of the present disclosure includes the following steps:

S101, when information is exchanged between users, a local-end social application acquires the security control authority of a local-end user set by an opposite-end user.

Preferably, in the embodiment, the local-end social application receives the security control authority of the local-end user which is set by the opposite-end user and sent by an opposite-end application. When information is exchanged between users, the security control authority of the local-end user set by the opposite end is acquired from stored information.

Certainly, the local-end social application also receives the security control authority of the opposite-end user set by the local-end user and sends the security control authority to the opposite-end application so that the copying operation and the screen capturing operation of the opposite-end user are controlled at the opposite end as required by the local end.

The timing at which the local-end social application or the opposite-end social application sends a security control authority may be any timing prior to the exchange of information, the present disclosure makes no specific limitations to this as long as the timing can guarantee the acquisition of security control authority information when information is exchanged.

Preferably, to prevent an unauthorized user from modifying a security control authority, preferably, in the present disclosure, the local-end application encrypts the security control authority information sent from the opposite-end application when receiving the security control authority and stores the encrypted security control authority in a nonvolatile memory. The encryption processing prevents the illegal modification of security control authority information by an unauthorized user.

Preferably, to prevent an unauthorized user from illegally deleting security control authority information, preferably, the following solution is also provided in an embodiment of the present disclosure:

the local-end social application sends an indication message indicative of no acquisition of security control authority to the opposite-end social application if the security control authority of the local-end user set by the opposite-end is not received by the local-end social application; and the local-end social application receives a feedback message from the opposite-end social application and controls the copying operation and the screen capturing operation of the local-end user according to the security control authority of the local-end user carried in the feedback message.

That is, if the local-end social application receives no security control authority information, then the local-end social application reports this situation to the opposite end for the opposite end to give an instruction on the next action of the local local-end social application, thereby preventing an illegal deletion operation. The opposite end can resend authority information to the local-end application for the local end to use, thus improving security.

S102: the local-end social application controls, according to the security control authority of the local-end user, the copying operation and the screen capturing operation of the local-end user on the information exchanged.

Preferably, in the step, the local-end user is permitted to perform a copying operation or a screen capturing operation on the information exchanged when the security control authority of the local-end user is high or forbidden to perform a copying operation or a screen capturing operation on the information exchanged when the security control authority of the local-end user is low.

Forbidding the local-end user to perform a screen capturing operation on the information exchanged specifically includes the following steps that:

the local-end social application forbids the local-end user to perform a screen capturing operation with a screen capturing key;

the local-end social application forbids the local-end user to perform a screen capturing operation using a connected third-party device; and the local-end social application forbids the local-end user to perform a screen capturing operation using a piece of installed screen capturing software.

Preferably, to improve security further, in the embodiment, the local-end social application automatically deletes the exchanged information after the information exchange between the users is completed in a case where the security control authority of the local-end user is low.

In conclusion, the solution provided in the embodiment of the present disclosure gives a user having a high security control authority a right to store pictures, words and videos through a copying operation or a screen capturing operation and forbids a user having a low security control authority to implement a copying operation or various screen capturing operations, thus guaranteeing the security of the exchange of information with an opposite user, preventing an unauthorized user from copying pictures, words or videos or capturing a screen on which pictures, words or videos are displayed and consequentially improving the security of the information of a user.

A preferred embodiment of the present disclosure is described below with reference to FIG. 2 and FIG. 3, and technical details of embodiments of the present disclosure are further illustrated with reference to the description of the embodiment so that the specific implementation process of the method provided herein can be described better.

Figure 2:
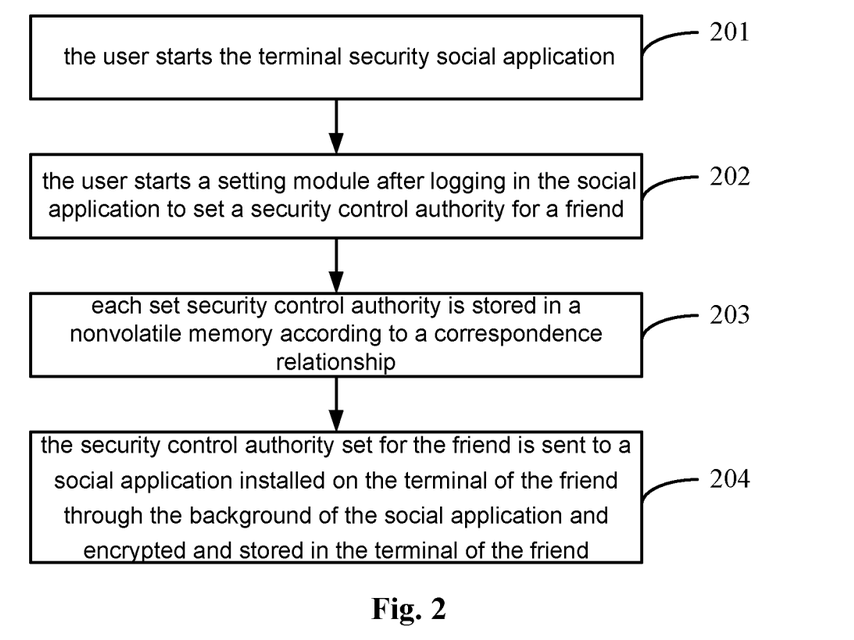
FIG. 2 is a flowchart illustrating the setting of a terminal security social application by a user provided in an embodiment of the present disclosure.

FIG. 2 is a flowchart illustrating the setting of a terminal security social application by a user provided in an embodiment of the present disclosure, and as shown in FIG. 2, this flow specifically includes:

S201: the user starts the terminal security social application, wherein the user needs to set a login password if the terminal security social application is used for the first time;

S202: the user starts a setting module after logging into the social application to set a security control authority for a friend;

S203: each set security control authority is stored in a nonvolatile memory according to a correspondence relationship; and S204: the security control authority set for the friend is sent to a social application installed on the terminal of the friend through the background of the social application and encrypted and stored in the terminal of the friend.

Figure 3:
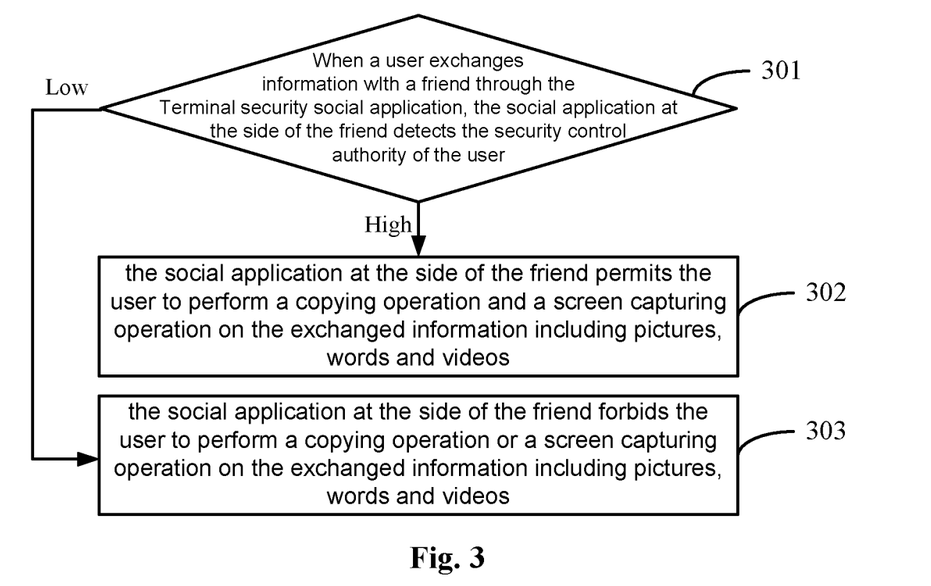
FIG. 3 is a flowchart illustrating an operation implemented by a terminal security social application to control a copying operation and a screen capturing operation according to a user security control authority according to an embodiment of the present disclosure.

FIG. 3 is a flowchart illustrating an operation implemented by a terminal security social application to control a copying operation and a screen capturing operation according to a user security control authority according to an embodiment of the present disclosure, and as shown in FIG. 3, this flow specifically includes:

S301: when a user exchanges information with a friend through the terminal security social application, the social application at the side of the friend detects the security control authority of the user, if the security control authority of the user is high, the flow proceeds to S302, otherwise, the flow proceeds to S303;

S302: the social application at the side of the friend permits the user to perform a copying operation and a screen capturing operation on the exchanged information including pictures, words and videos; and S303: the social application at the side of the friend forbids the user to perform a copying operation or a screen capturing operation on the exchanged information including pictures, words and videos.

Forbidding the user to perform a screen capturing operation mainly includes: forbidding the use of a screen capturing key for screen capturing, forbidding the use of a third-party device for screen capturing by forbidding the communication with the third-party device, and forbidding the use of a piece of installed screen capturing software for screen capturing.

Forbidding the use of a screen capturing key for screen capturing includes, but is not limited to: forbidding a screen capturing operation by occupying a shortcut key for screen capturing or a key combination for screen capturing;

forbidding the use of a third-party device for screen capturing includes, but is not limited to: forbidding a screen capturing operation by forbidding the communication with the third-party device; and forbidding the use of a piece of installed screen capturing software for screen capturing includes, but is not limited to: forbidding a screen capturing operation by requesting a system to close the screen capturing software run in the background.

Embodiment 2

Figure 4:
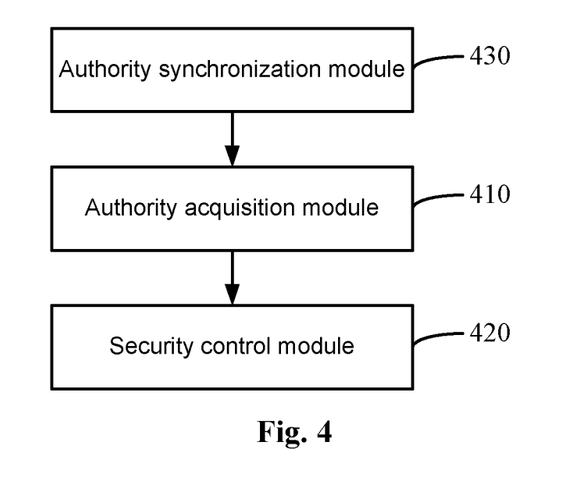
FIG. 4 is a block diagram illustrating the structure of a social application device provided in an embodiment of the present disclosure.

A social application device is provided in an embodiment of the present disclosure, and as shown in FIG. 4, the social application device includes:

an authority acquisition module 410 configured to acquire, when information is exchanged between users, the security control authority of a local-end user set by an opposite-end user; and a security control module 420 configured to control, according to the security control authority of the local-end user, the operation of the local-end user on the information exchanged.

Based on the foregoing structural frame and the foregoing implementation principle, several specific and preferred embodiments with the foregoing structure are provided below to elaborate and optimize the functions of the social application device described herein, and specifically, the following contents are involved:

Preferably, in the embodiment of the present disclosure, the social application device further includes:

an authority synchronization module 430 configured to receive and store the security control authority of the local-end user set by the opposite-end user and sent by an opposite-end social application device, acquire the security control authority of the opposite-end user set by the local-end user and send the security control authority to the opposite-end social application device.

Preferably, to prevent an unauthorized user from modifying a security control authority, preferably, in the embodiment of the present disclosure, the authority synchronization module 430 encrypts the security control authority information received from the opposite-end application when receiving the security control authority and stores the encrypted security control authority in a nonvolatile memory. The encryption processing prevents the illegal modification of security control authority information by an unauthorized user.

Preferably, to prevent an unauthorized user from illegally deleting security control authority information, preferably, the following solution is also provided in an embodiment of the present disclosure:

the authority acquisition module 410 is also configured to send an indication message indicative of no acquisition of security control authority to the opposite-end social application device when the security control authority of the local-end user set by the opposite-end is not received, receive a feedback message from the opposite-end social application device and trigger the security control module 420 according to the security control authority of the local-end user carried in the feedback message.

Preferably, in the embodiment, the security control module 420 is specifically configured to permit the local-end user to operate the exchanged information when the security control authority of the local-end user is high or forbid the local-end user to operate the exchanged information when the security control authority of the local-end user is low.

Specifically, the security control module 420 further includes:

a first screen capturing processing sub-module configured to forbid the use of a screen capturing key for screen capturing by occupying a shortcut key for screen capturing or a key combination for screen capturing;

a second screen capturing processing sub-module is configured to forbid the use of a third-party device for screen capturing by forbidding the communication with the third-party device; and a third screen capturing processing sub-module is configured to forbid the use of a piece of screen capturing software for screen capturing by requesting a system to close the screen capturing software run in the background.

Preferably, to improve security further, in the embodiment, the security control module 420 is also configured to automatically delete the exchanged information after the information exchange between the users is completed in a case where the security control authority of the local-end user is low.

In conclusion, the social application device (exactly, a virtual device) provided in the embodiment of the present disclosure gives a user having a high security control authority a right to store pictures, words and videos through a copying operation or a screen capturing operation and forbids a user having a low security control authority to implement a copying operation or various screen capturing operations, thus guaranteeing the security of the exchange of information with an opposite user, preventing an unauthorized user from perform a copying operation or a screen capturing operation on interactive contents including pictures, words and videos and consequentially improving the security of the information of a user.

Embodiment 3

In an embodiment of the present disclosure, a terminal is provided on which the social application device of embodiment 2 is installed. That is, a user can install the social application device on a terminal and exchange information safely by using the terminal as a carrier.

Because the working principle of the social application device has been described in detail in embodiment 2, the working of the social application device installed on a terminal is not described repeatedly in the embodiment.

In the embodiment of the present disclosure, a computer program is also disclosed which includes program instructions which, when executed by a terminal, cause the terminal to execute any one of the foregoing security control method for a social network user.

In the embodiment of the present disclosure, a carrier is provided on which the computer program is recorded.

Apparently, a variety of modifications and variations can be devised by those of ordinary skill in the art without departing from the spirit and principle of the present disclosure, and if these modifications and variations pertain to the scope of the appending claims and equivalent technologies, then the present disclosure is intended to cover these modifications and variations.

INDUSTRIAL APPLICABILITY

The present disclosure provides a simple and practical security control scheme for social network users which can be set freely by users and which can provide a better user experience, this scheme is currently lacked in many social application fields. By setting the authority of an opposite-end user to forbid an opposite-end user having a low authority to implement a copying operation or a screen capturing operation, the present disclosure prevents the various security problems caused by the loss of sensitive information without being perceived by a user.

Further, by encrypting a security control authority received by a local end from an opposite end and storing the encrypted security control authority in a nonvolatile memory, the present disclosure prevents an unauthorized user from modifying authority information arbitrarily and improves security further.

Therefore, the present disclosure is highly industrially applicable.

What is claimed is:

1. A security control method for a social network user, comprising:
   exchanging an information between users, and acquiring, by a local-end social application, a security control authority of a local-end user set by an opposite-end user and controlling, by the local-end social application, the operation of the local-end user on the exchanged information according to the security control authority;
   wherein the method further comprises:
   sending, by the local-end social application, an indication message indicative of no acquisition of security control authority to the opposite-end social application if the security control authority of the local-end user set by the opposite-end is not received by the local-end social application; and
   receiving, by the local-end social application, a feedback message from the opposite-end social application and controlling, by the local-end social application, the operation of the local-end user according to the security control authority of the local-end user carried in the feedback message.

2. The security control method as claimed in claim 1, wherein before acquiring, by the local-end social application, the security control authority of the local-end user set by the opposite-end user, the method further comprises:
   receiving and storing, by the local-end social application, the security control authority of the local-end user set by the opposite-end user and sent from an opposite-end application; and
   acquiring, by the local-end social application, the security control authority of the opposite-end user set by the local-end user and sending, by the local-end social application, the security control authority to the opposite-end application.

3. The security control method as claimed in claim 2, further comprising:
   encrypting, by the local-end social application, the security control authority of the local-end user set by the opposite-end user and sent from the opposite-end application when receiving the security control authority of the local-end user and storing, by the local-end social application, the encrypted security control authority in a nonvolatile memory; and
   storing, by the local-end social application, the security control authority of the opposite-end user set by the local-end user in the nonvolatile memory when acquiring the security control authority of the opposite-end user set by the local-end user.

4. The security control method as claimed in claim 1, wherein the step of controlling, by the local-end social application, the operation of the local-end user on the exchanged information according to the security control authority comprises:
   permitting the local-end user to operate the exchanged information when the security control authority of the local-end user is high; and
   forbidding the local-end user to operate the exchanged information when the security control authority of the local-end user is low.

5. The security control method as claimed in claim 1, wherein the operation is a copying operation and/or a screen capturing operation.

6. The security control method as claimed in claim 5, wherein the step of forbidding the local-end user to operate the exchanged information comprises:

forbidding, by the local-end social application, the local-end user to perform a screen capturing operation with a screen capturing key;

forbidding, by the local-end social application, the local-end user to perform a screen capturing operation using a connected third-party device; and forbidding, by the local-end social application, the local-end user to perform a screen capturing operation using a piece of installed screen capturing software.

7. The security control method as claimed in claim 6, wherein the step of forbidding, by the local-end social application, the local-end user to perform a screen capturing operation with a screen capturing key comprises: forbidding, by the local-end social application, the use of the screen capturing key for screen capturing by occupying a shortcut key for screen capturing or a key combination for screen capturing;

the step of forbidding, by the local-end social application, the local-end user to perform a screen capturing operation using a connected third-party device comprises: forbidding, by the local-end social application, the use of the connected third-party device for screen capturing by forbidding the communication with the third-party device; and the step of forbidding, by the local-end social application, the local-end user to perform a screen capturing operation using a piece of installed screen capturing software comprises: forbidding, by the local-end social application the use of the screen capturing software for screen capturing by requesting the system to close the screen capturing software run in the background.

8. The security control method as claimed in claim 1, further comprising:

automatically deleting, by the local-end social application, the exchanged information after the information exchange between the users is completed in a case where the security control authority of the local-end user is low.

9. A social application device, which comprises a hardware processor and a memory, wherein the hardware processor is configured to execute program modules stored in the memory, and the program modules comprises: an authority acquisition module and a security control module, wherein the authority acquisition module is configured to acquire, when information is exchanged between users, a security control authority of a local-end user set by an opposite-end user; and the security control module is configured to control, according to the security control authority of the local-end user, the operation of the local-end user on the information exchanged;

wherein the authority acquisition module is also configured to:

send an indication message indicative of no acquisition of security control authority to the opposite end when the security control authority of the local-end user set by the opposite-end is not received; and receive a feedback message from the opposite end and trigger the security control module according to the security control authority of the local-end user carried in the feedback message.

10. The social application device as claimed in claim 9, further comprising:

an authority synchronization module configured to receive and store the security control authority of the local-end user set by the opposite-end user and sent from an opposite end, acquire the security control authority of the opposite-end user set by the local-end user and send the security control authority to the opposite end.

11. The social application device as claimed in claim 9, wherein the security control module is configured to control, according to the security control authority of the local-end user, the operation of the local-end user on the exchanged information in the following way:

the security control module permits the local-end user to operate the exchanged information when the security control authority of the local-end user is high, or the security control module forbids the local-end user to operate the exchanged information when the security control authority of the local-end user is low.

12. The social application device as claimed in claim 9, wherein the operation is a copying operation and/or a screen capturing operation.

13. The social application device as claimed in claim 12, wherein the security control module further includes a first screen capturing processing sub-module, a second screen capturing processing sub-module and a third screen capturing processing sub-module, wherein the first screen capturing processing sub-module is configured to forbid the use of a screen capturing key for screen capturing by occupying a shortcut key for screen capturing or a key combination for screen capturing;

the second screen capturing processing sub-module is configured to forbid the use of a third-party device for screen capturing by forbidding the communication with the third-party device; and the third screen capturing processing sub-module is configured to forbid the use of a piece of screen capturing software for screen capturing by requesting a system to close the screen capturing software run in the background.

14. The security control method as claimed in claim 3, wherein the step of controlling, by the local-end social application, the operation of the local-end user on the exchanged information according to the security control authority comprises:

permitting the local-end user to operate the exchanged information when the security control authority of the local-end user is high; and forbidding the local-end user to operate the exchanged information when the security control authority of the local-end user is low.

15. The security control method as claimed in claim 1, wherein the step of controlling, by the local-end social application, the operation of the local-end user on the exchanged information according to the security control authority comprises:

permitting the local-end user to operate the exchanged information when the security control authority of the local-end user is high; and forbidding the local-end user to operate the exchanged information when the security control authority of the local-end user is low.

16. The security control method as claimed in claim 1, wherein the operation is a copying operation and/or a screen capturing operation.

17. The social application device as claimed in claim 9, wherein the security control module is configured to control, according to the security control authority of the local-end user, the operation of the local-end user on the exchanged information in the following way:

the security control module permits the local-end user to operate the exchanged information when the security control authority of the local-end user is high, or the security control module forbids the local-end user to operate the exchanged information when the security control authority of the local-end user is low.

18. The social application device as claimed in claim 9, wherein the operation is a copying operation and/or a screen capturing operation.

\* \* \* \* \*